United States Patent
Wenzel

(10) Patent No.: US 9,284,766 B2
(45) Date of Patent: Mar. 15, 2016

(54) DEVICE FOR MOVING A MOVABLE FURNITURE PART, AND PIECE OF FURNITURE

(75) Inventor: Holger Wenzel, Lindau (DE)

(73) Assignee: GRASS GMBH, Hochst (AT)

( * ) Notice: Subject to any disclaimer, the term of this patent is extended or adjusted under 35 U.S.C. 154(b) by 0 days.

(21) Appl. No.: 14/116,607

(22) PCT Filed: May 4, 2012

(86) PCT No.: PCT/EP2012/001917
§ 371 (c)(1),
(2), (4) Date: Jan. 16, 2014

(87) PCT Pub. No.: WO2012/152417
PCT Pub. Date: Nov. 15, 2012

(65) Prior Publication Data
US 2014/0184123 A1 Jul. 3, 2014

(30) Foreign Application Priority Data

May 12, 2011 (DE) ...................... 20 2011 100 573 U

(51) Int. Cl.
*H02P 3/00* (2006.01)
*H02P 7/00* (2006.01)
(Continued)

(52) U.S. Cl.
CPC .............. *E05F 15/10* (2013.01); *E05F 15/603* (2015.01); *E05F 15/611* (2015.01);
(Continued)

(58) Field of Classification Search
CPC .............. B60N 2/0248; B60N 2/0232; A47B 2210/0089; A47B 88/0414; A61G 12/001; F25D 25/025; G05B 19/05; G05B 19/40; G05B 19/416; G05B 2219/34016; G05B 2219/37169; G05B 2219/37622; G05B 2219/41276
USPC .......................................... 318/266, 466, 468
See application file for complete search history.

(56) References Cited

U.S. PATENT DOCUMENTS 4,434,468 A * 2/1984 Caddick et al. ................. 701/49
4,463,426 A * 7/1984 Caddick et al. ................. 701/49
(Continued)

FOREIGN PATENT DOCUMENTS

AT 507282 3/2010
AT 11754 4/2011
(Continued)

*Primary Examiner* — Paul Ip
(74) *Attorney, Agent, or Firm* — Hoffmann & Baron, LLP

(57) ABSTRACT

In a device for moving a furniture part, in particular a shutter, door or drawer, which is accommodated in a movable manner on a basic furniture structure, having an actuating drive, which, in a drive mode, is connected to the movable furniture part and drives the movable furniture part, and having a sensor means, which is connected to the actuating drive and is intended for activating the actuating drive, the sensor means has a database and is designed such that, with the device installed in the use state, physical state variables to which the movable furniture part is subjected via the user, and which serve for monitoring the movement of said furniture part, can be sensed and read into the database, wherein the database has, or can have, stored in it movement profiles which are each assigned to a certain movement situation of the movable furniture part which is initiated by external action on the movable furniture part and can be described by physical state variables, and wherein, with the aid of at least one sensed physical state variable, a certain associated movement profile can be retrieved from the database and the actuating drive can be activated in accordance with the movement profile achieved.

12 Claims, 1 Drawing Sheet

(51) Int. Cl.
  *E05F 15/10* (2006.01)
  *G05B 13/02* (2006.01)
  *E05F 15/603* (2015.01)
  *E05F 15/611* (2015.01)

(52) U.S. Cl.
  CPC ........ *G05B 13/0265* (2013.01); *E05Y 2400/36* (2013.01); *E05Y 2400/44* (2013.01); *E05Y 2400/456* (2013.01); *E05Y 2800/113* (2013.01); *E05Y 2900/20* (2013.01)

(56) References Cited

U.S. PATENT DOCUMENTS

| | | | |
|---|---|---|---|
| 7,171,578 B2 * | 1/2007 | McNutt | 713/501 |
| 7,812,561 B2 * | 10/2010 | Hagen et al. | 318/568.13 |
| 8,067,915 B2 * | 11/2011 | Hooker et al. | 318/466 |
| 2004/0174200 A1 * | 9/2004 | McNutt | 327/291 |
| 2007/0067084 A1 * | 3/2007 | Shen et al. | 701/49 |
| 2009/0091223 A1 * | 4/2009 | Hagen et al. | 312/330.1 |
| 2009/0138122 A1 * | 5/2009 | Wagner | 700/226 |
| 2010/0168920 A1 * | 7/2010 | Hooker et al. | 700/275 |
| 2012/0209422 A1 * | 8/2012 | Wagner | 700/226 |

FOREIGN PATENT DOCUMENTS

| | | |
|---|---|---|
| DE | 102004045568 | 3/2006 |
| DE | 102005044690 | 3/2007 |
| DE | 102007036747 | 2/2009 |
| WO | WO2006099645 | 9/2006 |
| WO | WO2007035971 | 4/2007 |

* cited by examiner

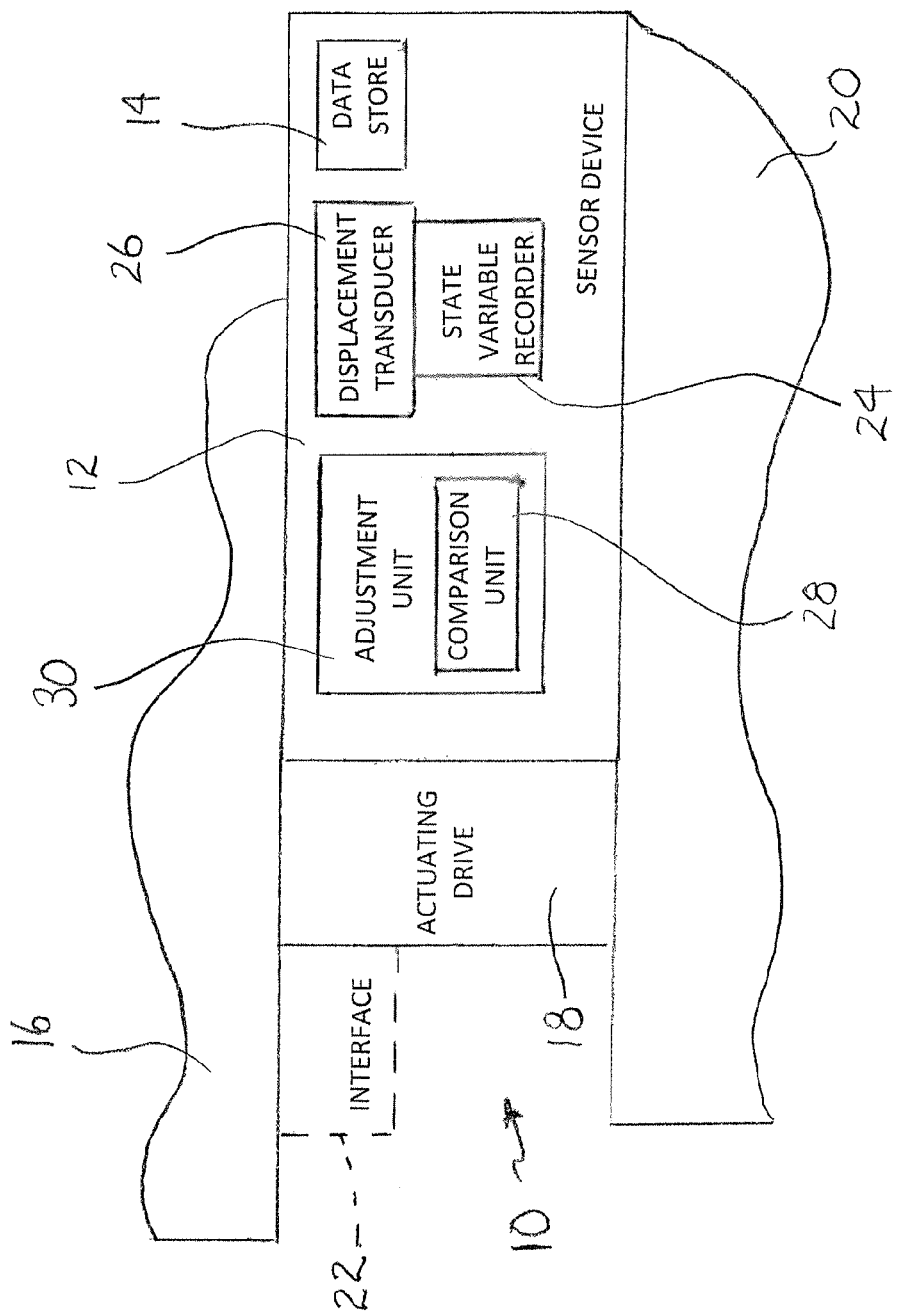

DEVICE FOR MOVING A MOVABLE FURNITURE PART, AND PIECE OF FURNITURE

This application claims priority based on an International Application filed under the Patent Cooperation Treaty, PCT/EP2012/001917, filed May 4, 2012, which claims priority to DE2011100573.2, filed May 12, 2011.

BACKGROUND OF THE INVENTION

The invention relates to a device for moving a furniture part which is movably received on a furniture carcass, in particular a flap, door or drawer, having an actuating drive which is connected to the movable furniture part in a drive mode and which drives the movable furniture part, and having a sensor device which is connected to the actuating drive for controlling the actuating drive. The invention further comprises a piece of furniture provided with such a device.

It is already known to drive furniture parts movably received in a furniture carcass of a piece of furniture in a movable manner by means of an actuating drive. There are further known sensor devices, by means of which a detection of physical variables necessary for controlling the movement of the movable furniture part can be detected. The sensor device may be configured in such a manner that it communicates with the actuating drive so that the actuating drive can be controlled in accordance with a control signal established, whereby the movement of the movable furniture part can ultimately be controlled.

SUMMARY OF THE INVENTION

An object of the invention is to provide a device and a piece of furniture of the type mentioned in the introduction, in which the movable furniture part can be operated in an even more comfortable manner. Intuitive operation of the movable furniture part is thereby particularly intended to be possible.

This object is achieved by a device for moving a furniture part which is movably received on the furniture carcass according to independent claim 1 and a piece of furniture according to independent claim 13. The dependent claims set out developments of the invention.

BRIEF DESCRIPTION OF THE DRAWINGS

FIG. 1 is a schematic representation of the device for moving a furniture part, according to the present invention.

DETAILED DESCRIPTION OF THE PREFERRED EMBODIMENTS

The device 10 according to the invention is distinguished in that the sensor device 12 has a data store 14 and is constructed in such a manner that, in the assembled useful state of the device, physical state variables which act on the movable furniture part 16 via the user and which are used for controlling the movement thereof can be detected and can be read into the data store, movement profiles being stored or being able to be stored in the data store and each being associated with a specific movement situation of the movable furniture part, which movement situation is triggered from the outer side by an action on the movable furniture part and can be described by physical state variables, and a specific associated movement profile being able to be called up from the data store by means of at least one detected physical state variable and the actuating drive 18 being able to be controlled in accordance with the movement profile called up.

When the movable furniture part is operated, therefore, a physical state variable is measured or detected with the sensor device. If the physical state variable detected is representative of a stored movement profile, the profile is read from the data store so that the actuating drive and consequently the movable furniture part connected therewith is moved in accordance with the movement profile. The movement profile can be carried out in such a manner that, in principle, an active accompanying movement by the user is no longer necessary. The user could therefore let go. However, it is also possible for at least one movement profile to be configured in such a manner that an active movement support by the user is possible. A higher level of operating comfort is thereby generally achieved. It would also be possible to refer in this instance to an intelligent movable furniture part because the device reacts in a completely intuitive manner to a specific movement situation by means of a specific movement profile.

The movably received furniture part 16 may, for example, be a drawer or a pull-out member which is received in a displaceable manner via a guide unit and in a movable manner on a furniture carcass 20, or a door, flap or the like which can be pivoted relative to a furniture carcass.

An interface 22 having, for example, gear components or coupling components, may be provided between the actuating drive 18 and the movable furniture part 16, whereby it is optionally possible to have a drive brought about by means of the actuating drive or a manual drive in respect of the movable furniture part. In this instance, the movement patterns can then be called up only in the non-manual drive of the movable furniture part. When the movable furniture part is driven manually, the actuating drive is decoupled from the movable furniture part. In a particularly preferred manner, however, there is always a connection between the actuating drive and the movable furniture part. In this instance, therefore, it is possible to dispense with an interface with the gear and/or coupling components.

In a development of the invention, the sensor device has an operating mode in which movement profiles already stored can be called up from the data store. The sensor device advantageously has, in addition to the operating mode, a learning mode which can be activated in place of the operating mode. If the learning mode is activated, it is possible for new movement profiles to be able to be learned during the movement of the movable furniture part and to be able to be stored in the data store. This is advantageous, for example, when the movement profiles are intended, when the device is in the installed useful state, to be adapted to a specific user who often operates the movable furniture part. Therefore, movement profiles which are personalised with regard to at least one specific user can be learnt and stored. The personalised movement profiles may optionally be authorised by the user, for example, with a personal authorisation code so that they are only accessible to him. For example, a wireless authorisation signal which can be transmitted by the user, for example, by means of a remote control, is suitable for the authorisation.

The physical state variables which can be measured or detected via the sensory device may be, for example, force, pressure, speed, acceleration, time and/or displacement.

To this end, the sensor device 12 advantageously has a state variable recorder 24. The state variable recorder 24 is in the form of a state variable sensor in a particularly preferable manner, the measured physical state variable being converted into an electrical voltage which may be increased via a measurement amplifier.

In order to detect force applied by the user to the movable furniture part, therefore, a force transducer, for example, force sensor, can be used. All conceivable types of force transducers or force sensors can be used, for example, ones which are provided with expansion measurement strips, whose electrical resistance changes with expansion. An alternative to these would be piezoelectric force transducers.

Users operate a movable furniture part in very different manners. Whereas some users carefully operate the movable furniture part with a relatively small force, for example, open it or close it, other users tend to move the movable furniture part in an abrupt manner, that is to say, with great force. The force currently applied by the user can therefore be measured by means of the force transducer. The force detected correlates to a specific movement profile which is stored in the data store and which can thereby be called up. In order to prevent, for example, the movable furniture part operated by the user in an abrupt manner from continuing to be moved too rapidly as a result (typical example: slamming shut a furniture flap), it is possible to call up a movement profile which brakes the movable furniture part. It is thereby possible to prevent, for example, a hard impact in the end position or, in the case of an end position damping, an excessively powerful loading of the end position damping. Conversely, in the case of a low force detected, it is possible to call up a movement profile which ensures acceleration of the movable furniture part and therefore actively supports the continued movement of the movable furniture part by the user. The called-up movement profile can therefore react to the action of the user.

It is also possible to use an acceleration recorder, in particular an acceleration sensor. To this end, the data store can store movement profiles which are associated with a negative or positive acceleration of the movable furniture part. Instead of or in addition to the detection of the force applied by the user, therefore, the acceleration may be measured, which may lead to the same result as the one described above, that a movement profile which brakes the movable furniture part is therefore called up in the event of excessively great acceleration.

In a development of the invention, at least one of the movement profiles stored is associated with a specific movement path and, after it has been travelled, with a specific position of the movable furniture part, the movement profile preferably beginning to run directly after that position has been reached or after an adjustable time period has expired. To this end, for example, the state variable recorder may be in the form of a displacement transducer 26. Time periods are preferably used when a movable furniture part is opened and no longer closed. After the time period expires, the movable furniture part can automatically close without any intervention by the user.

The stored or storable movement profiles may be of any type. Thus, for example, it is possible to store a movement profile, in the event of whose activation the movable furniture part opens only to half its full extent. Furthermore, it is possible to react to impediments in the movement path of the movable furniture part by means of the movement profiles, for example, by measuring the force which is applied to the movable furniture part and which becomes very large in the event of an impediment, or by measuring the speed which is then equal to zero. If this is the case, the movable furniture part can be moved back by the called-up movement profile, for example, into the starting position thereof. As already mentioned, an important aspect is the ability of individual movement profiles which are adapted to a specific user to be stored. It is thereby possible for the movable furniture part to be opened at a speed desired by the user or, as desired by the user, not to be completely opened and/or to be closed again automatically after a specific time period.

In a development of the invention, the sensor device 12 has a comparison unit 28 for comparing detected physical state variables with physical state variables which are stored in the data store 14 and which are associated with specific movement profiles. The physical state variables detected are advantageously converted into electrical signals and transmitted to the comparison unit 28 by means of signal transmission, for example, wirelessly. A comparison of the detected actual value of the physical state variable with stored measurement values which are associated with a specific movement profile can then be carried out. If the values correspond or are within a specific tolerance range, the movement profile is called up.

The sensor device advantageously has a control or adjustment unit 30 for controlling or adjusting the actuating drive 18. The comparison unit 28 is advantageously inside the control or adjustment unit 30. It is possible to carry out the signal processing inside the control or adjustment unit. To this end, the control or adjustment unit can, for example, be provided with a processor. Alternatively or in addition to the control or adjustment unit on-board the sensor device, it is also possible to use an external control or adjustment unit. In a preferred manner, the control or adjustment unit controls/adjusts the actuating drive with regard to the speed or torque thereof.

It is possible for the sensor device to have a plurality of state variable recorders of different types, for example, at least one displacement transducer and at least one force transducer.

It is possible for the state variable sensor to be operated with auxiliary electrical energy which can preferably be obtained from the movement of the movable furniture part. It is thereby possible to dispense with batteries or accumulators for electrical power supply. Naturally, it is also possible, alternatively or additionally, to operate the state variable sensor with batteries or accumulators.

In a development of the invention, the actuating drive is in the form of an electrical actuating drive. In principle, a pneumatic actuating drive would also be possible.

The invention claimed is:

1. A device for moving a furniture part which is movably received on a furniture carcass, in particular a flap, door or drawer, the device comprising:
   an actuating drive connected to the movable furniture part in a drive mode, the actuating drive including a drive mechanism for driving the movable furniture part; and
   a sensor device connected to the actuating drive for controlling the actuating drive, wherein the sensor device has an electrical circuit forming a data store and is further configured to detect physical state variables which act on the movable furniture part via the user and which are used for controlling the movement thereof, the physical state variables being read into the data store, and the data store further storing movement profiles, wherein each movement profile is associated with a respective movement situation of the movable furniture part, each movement situation being triggered from the outer side by an action on the movable furniture part and is described by the physical state variables, the sensor device calling up a specific movement profile associated with a triggered movement situation from the data store by means of at least one detected physical state variable for controlling the actuating drive, and
   wherein the sensor device further comprises a displacement transducer for detecting a movement path of the movable furniture part.

2. A device according to claim 1, wherein the sensor device has an operating mode in which movement profiles already stored can be called up from the data store and has a learning mode which can be activated in place of the operating mode and in which new movement profiles can be learned during the movement of the movable furniture part and can be stored in the data store.

3. A device according to claim 1, wherein at least one of the stored movement profiles is associated with a negative or positive acceleration of the movable furniture part, a hard impact of the movable furniture part at the end positions thereof being able to be prevented by means of that movement profile.

4. A device according to claim 1, wherein at least one of the movement profiles stored is associated with a specific movement path and, after it has been travelled, with a specific position of the movable furniture part, the movement profile beginning to run directly after that position has been reached or after an adjustable time period has expired.

5. A device according to claim 1, wherein the sensor device has a comparison unit for comparing detected physical state variables with physical state variables which are stored in the data store and which are associated with specific movement profiles.

6. A device according to claim 1, further comprising a force transducer.

7. A device according to claim 1, wherein the displacement transducer is operated with auxiliary electrical energy which can be obtained from the movement of the movable furniture part.

8. A device according to claim 1, wherein the sensor device has a control or adjustment unit for controlling or adjusting the electrical drive.

9. A device according to claim 1, wherein the sensor device is configured for a wireless signal transmission between itself and the electrical drive.

10. A device according to claim 1, wherein the actuating drive is in the form of an electrical actuating drive.

11. A piece of furniture having at least one movable furniture component, such as a flap, door or drawer, characterised by a device according to claim 1.

12. A device for moving a furniture part which is movably received on a furniture carcass, the device comprising:
an actuating drive connected to the movable furniture part in a drive mode, the actuating drive including a drive mechanism for driving the movable furniture part; and
a sensor device connected to the actuating drive for controlling the actuating drive, wherein the sensor device has an electrical circuit forming a data store and is further configured to detect physical state variables which act on the movable furniture part via the user and which are used for controlling the movement thereof, the physical state variables being read into the data store, and the data store further storing movement profiles, wherein each movement profile is associated with a respective movement situation of the movable furniture part, each movement situation being triggered from the outer side by an action on the movable furniture part and is described by physical state variables, the sensor device calling up a specific movement profile associated with a triggered movement situation from the data store by means of at least one detected physical state variable for controlling the actuating drive,
wherein the sensor device has an operating mode in which movement profiles already stored can be called up from the data store and has a learning mode which can be activated in place of the operating mode and in which new movement profiles can be learned during the movement of the movable furniture part and can be stored in the data store.

* * * * *